United States Patent [19]
Licari

[11] Patent Number: 6,039,887
[45] Date of Patent: Mar. 21, 2000

[54] COLANDER WITH AN EXTENDED LATERAL STABILIZER PORTION

[76] Inventor: Yaffa Licari, 875 Ocean Ave., Elberon, N.J. 07740

[21] Appl. No.: 08/809,628

[22] PCT Filed: Sep. 29, 1995

[86] PCT No.: PCT/US95/12571

§ 371 Date: Mar. 27, 1997

§ 102(e) Date: Mar. 27, 1997

[87] PCT Pub. No.: WO96/10941

PCT Pub. Date: Apr. 18, 1996

Related U.S. Application Data

[63] Continuation-in-part of application No. 08/316,099, Sep. 30, 1994, Pat. No. 5,505,850.

[51] Int. Cl.$^7$ ............................. B01D 24/22; B01D 29/00
[52] U.S. Cl. ......................... 210/800; 210/473; 210/477; 210/800; 210/482
[58] Field of Search ..................................... 210/464, 474, 210/477, 465, 469, 470, 473, 482, 497.01, 800; D7/667, 668

[56] References Cited

U.S. PATENT DOCUMENTS

| D. 254,529 | 3/1980 | Arnoff | D7/667 |
| D. 327,608 | 7/1992 | Daenen et al. | D7/667 |
| D. 334,691 | 4/1993 | Feer | D7/667 |
| D. 339,506 | 9/1993 | Feer | D7/667 |
| D. 339,720 | 9/1993 | Kolada | D7/667 |
| 462,076 | 10/1891 | Devoll | D7/667 |
| 831,566 | 9/1906 | Norris | D7/668 |
| 3,091,339 | 5/1963 | Marra et al. | D7/667 |
| 4,452,581 | 6/1984 | Panehal | 210/469 |
| 5,279,007 | 1/1994 | Kolada | 210/474 |

*Primary Examiner*—W. L. Walker
*Assistant Examiner*—Marianne S. Ocampo
*Attorney, Agent, or Firm*—Rohm & Monsanto, PLC

[57] ABSTRACT

An apparatus for straining or rinsing is constructed with a bowl portion having an upper rim, the bowl portion being provided with a plurality of perforations through the wall thereof. The bowl portion provided with an engagement portion, which may be integrally formed therewith, for engaging with a predeterminable portion of a kitchen sink. Various embodiments of the invention engage with sink wall intermediate of a dual sink arrangement, or a standardsink faucet or valve. The employment of the engagement portion obviates the need to occupy the bottom surface of the sink during such straining or rinsing. In addition, the invention includes a method of employing a colander.

9 Claims, 7 Drawing Sheets

COLANDER WITH AN EXTENDED LATERAL STABILIZER PORTION

CROSS REFERENCE TO RELATED APPLICATION

This application is a continuation-in-part patent application of U.S. Ser. No. 08/316,099 filed on Sep. 30, 1994, now U.S. Pat. No. 5,505,850.

BACKGROUND OF THE INVENTION

1. Field of the Invention

The present invention relates to kitchen utensils generally intended for rinsing and preparing foods such as berries, noodles, pastas and macaroni, vegetables and the like. More particularly, the present invention relates to kitchen accessories known as strainers and/or colanders which are generally used for rinsing fruits and vegetables and straining cooked foods such as noodles, pasta and macaroni, and method of using same.

2. Description of the Prior Art

For thousands of years, since before the age of the Roman Empire, man has used various implements for the separation of solid substances from fluids, or to separate solids of different dimensions from one another. Such separation implements which separate mixtures of materials having differences in physical dimension or being in different physical states, i.e., solid versus liquid phase, are known by various terms including, but not necessarily limited to, sieves, meshes, filters, screens, strainers, sifters, colanders, and the like. For purposes of ease of discussion, the general class of separating devices will be referred to herein as straining devices.

Generally, the structure of most straining devices includes a container portion into which the mixture or slurry of materials to be strained or separated is poured and at least briefly contained. Usually, the bottom, and sometimes the sides, of the container portion has a plurality of openings. The dimensions of the openings are established to permit either the passage of that material which one desires to collect or to retain that material which one seeks to keep. Optional components of a strainer which would be used in food preparation are a handle by which the user holds the strainer and legs on which the strainer may be rested while the materials to be strained are poured from a primary holding container into the strainer itself. Known handles include a straight member extending horizontally from an upper edge or rim of the strainer or its container portion. Another known version of a strainer is shaped much like a coffee mug having one or more handles, each of which is D-shaped and projects horizontally in an outward direction (rather than vertically and in a downward direction) from the upper edge or rim of the strainer or its container portion.

The addition of one or more handles or legs to the basic structure developed out of the need to be able to strain hot mixtures. The handles allow a user to hold the strainer with his or her hands at a safe distance from the container portion while pouring in the hot mixture. However, a strainer having a single handle suffers from the disadvantage that a lone user would have only one hand available for lifting the container holding the hot mixture since the other hand must control the strainer itself. Additionally, the wrist of the hand holding the strainer is subjected to a great strain due to the torque when the mixture is initially deposited into the strainer.

The addition of legs to a strainer allows the user to place the strainer on an even surface, thus freeing both hands for lifting the container having the hot mixture. However, this structure suffers from the disadvantage that it requires the user to place the strainer onto a surface which will permit the separated liquid to flow safely away from the strainer. This is particularly important when straining edibles and comestibles, as it avoids fluid contamination of the food. In most households, the only suitable surface for draining away water or other fluid from a strainer placed thereon is in the kitchen sink. However, when a cook is preparing a meal, the kitchen sink can become the most dear of all the surface areas in a kitchen, and it is often quite inconvenient to devote all or nearly all of the sink to a strainer. Additionally, it may occur that the bottom of the kitchen sink is already occupied by other items such as dirty dishes, vegetable peels, etc., which must be removed therefrom in order to rest a strainer on the sink bottom, requiring additional time and energy when it may be most inconvenient. Failure to remove such objects can result in the strainer tipping over, spilling its contents, or that the contents of the strainer will come into contact with unhygienic or unsavory materials, such as food scrapings, dirty soap water, and the like.

It is notable that the basic design of the strainer has not changed substantially, from a structural standpoint, in thousands of years. The strainers and colanders of today still suffer from these disadvantages. Although modem materials have been developed for manufacturing the strainer and colander of today, most notably the polyethylene, polypropylene, and other plastics and copolymers, the structure has remained relatively unchanged.

It is, therefore, an object of the present invention to provide an apparatus for straining which reduces the risk of scalding his or her hands during the straining of hot mixtures.

It is another object of the present invention to provide an apparatus for straining which reduces the physical stress placed on the user's wrist.

It is still another object of the present invention to provide an apparatus which is useable in such a manner as to enable the user to perform other tasks with his or her hands while a straining or rinsing process continues.

It is yet another object of the present invention to provide an apparatus for straining or rinsing which permits such process to proceed without requiring any of the area at the bottom of the kitchen sink.

It is yet a further object of the present invention to provide an apparatus for straining or rinsing, and a method of using same, which will maintain food products being processed elevated well above the bottom of the kitchen sink, thereby avoiding communication of the food products with unhygienic or unsavory materials which may be at the bottom of the sink, such as food waste and trimmings, food scrapings, detergents, and the like.

It is still a further object of the present invention to provide an apparatus for straining or rinsing, and a method of using same, wherein the risk of tipping over the strainer and spilling its contents is reduced.

SUMMARY OF THE INVENTION

The foregoing objectives and others not specifically enumerated herein are achieved by the present invention which relates generally to an apparatus for straining mixtures of solid and/or semisolid edible and comestibles in the environment of a kitchen. However, it should be understood that the embodiments described herein are merely exemplary and that a person skilled in the art may make many variations and modifications without departing from the spirit and scope of the invention. All such modifications and variations are intended to be included within the scope of the invention as described herein.

The present invention relates more particularly to a colander for rinsing and straining edibles and comestibles of a solid or semi-solid form, and further includes a bowl portion which, in certain embodiments, has an upper rim. The bowl portion includes a plurality of perforations through the wall thereof through which water or another liquid will pass, but dimensioned so that the desired solid or semi-solid is retained therein. The bowl portion is surrounded at its upper most point by a flange-like upper rim. The bowl portion is further provided with either nozzle engaging means for hookingly engaging around a sink faucet or rim engaging means for hookingly engaging over the sink rim. The colander may further have a handle attached at a second position on the upper rim for increased ease of handling the colander when it is filled. Alternatively, the colander may have a gripping means integrally formed into the upper rim.

In accordance with a first apparatus aspect of the invention, a colander is provided for rinsing and straining at a sink having a bottom surface and a sink faucet. The sink faucet has a back surface facing away from the sink. In accordance with the invention, the colander is provided with a bowl portion having an upper rim and a wall portion defining an inner surface and an outer surface on opposite sides thereof, the bowl portion including a plurality of perforations in the wall portion extending between the inner and outer surfaces. In addition, an engagement portion is provided for coupling the bowl portion to the sink. The engagement portion is itself provided with a stabilizer portion which is coupled at a first end thereof to the bowl portion and which extends laterally away from the bowl portion along a plane substantially parallel with the upper rim. Additionally, a coupler portion is coupled to a second end of the stabilizer portion, and has a coupler contact surface for communicating with the back surface of the sink faucet. The colander is supported from the sink faucet and the bowl portion is maintained elevated above the bottom surface of the sink.

In one embodiment of the invention, the coupler contact surface of the coupler portion has an arcuate configuration which extends over an arc of approximately 60°. In a specific illustrative embodiment of the invention, there is further provided length adjustment facility interposed between the stabilizer portion and the coupler portion of the engagement means for adjusting a distance between the coupler contact surface of the coupler portion and the outer surface of the bowl portion.

In a further embodiment, the stabilizer portion extends laterally away from the bowl portion along a plane substantially coplanar with a plane defined by the upper rim. The second end of the stabilizer portion of the engagement portion is angularly displaced with respect to the first portion, whereby a space is created between the first end of the stabilizer portion and the coupler contact surface of the coupler portion.

In accordance with a further apparatus aspect of the invention, a colander is provided for rinsing and straining at a sink having a bottom surface and a sink portion having a back surface facing away from the sink. The colander is provided with a bowl portion having an upper rim and a wall portion defining an inner surface and an outer surface on opposite sides thereof. The bowl portion includes a plurality of perforations in the wall portion extending between the inner and outer surfaces. There is additionally provided and engagement portion for coupling the bowl portion to the sink. The engagement portion has a stabilizer portion coupled at a first end thereof to the bowl portion and extending laterally away from the bowl portion along a stabilizer plane which is substantially parallel with the upper rim. Additionally, a coupler portion is coupled to a second end of the stabilizer portion and having a coupler contact surface for communicating with the back surface of the sink portion, whereby the colander is supported therefrom with the bowl portion elevated above the bottom surface of the sink.

In accordance with a specific illustrative embodiment of this further aspect of the invention, the stabilizer portion is integrally formed with the coupler portion. Additionally, the coupler portion is arranged to extend at an angle of from approximately sixty degrees to approximately one hundred and ten degrees, and preferably in the range of from about sixty five degrees to about ninety degrees.

In a still further embodiment, the stabilizer portion is integrally formed with the wall portion of the bowl portion at a position adjacent to the first end of the engagement portion. A stabilizer insert is provided for preventing front-to-back movement of the colander, and the wall portion of the bowl portion is provided with a further coupling means for coupling the stabilizer insert to the bowl portion. There is further provided a length adjustment facility interposed between the stabilizer portion and the coupler portion of the engagement means for adjusting a distance between the coupler contact surface of the coupler portion and the outer surface of the bowl portion.

The stabilizer portion, in certain embodiments, extends laterally away from the bowl portion along a plane which is substantially coplanar with a plane defined by the upper rim.

In accordance with a method aspect of the invention, a method of employing a colander over a sink is provided whereby the colander is elevated above the bottom of the sink, the colander being of the type having a bowl portion with a rim, the method comprising the steps of:

securing a portion of the colander to a portion of the sink whereby a supporting force having a predetermined direction is applied to a predetermined portion of the rim of the colander, whereby the colander is maintained by the supporting force elevated above the bottom of the sink; and     stabilizing the colander with respect to a portion of the sink other than the bottom thereof whereby the colander is prevented from rotating in a direction substantially orthogonal to the supporting force.

In a specific illustrative embodiment of the invention of this method aspect of the invention, there is provided the step of hooking a hook coupled to the colander around a faucet affixed to the sink. There additionally are provided the steps of:

adjusting the length of the hook with respect to the colander; and     fixing the length of the hook to a length dimension corresponding to the location of the faucet with respect to the sink.

In a further embodiment, there is provided the step of securing comprises the step of engaging an engagement portion coupled to the colander over a rim portion of the sink. This step may include the further steps of:

adjusting the length of the engagement portion with respect to the colander; and     fixing the length of the engagement portion to a length dimension corresponding to the thickness of the rim portion of the sink.

Additionally, the step of engaging includes the further step of communicating grippingly with a wall surface of the sink, and the step of stabilizing includes the step of communicating with a top surface of the rim portion of the sink.

Referring once again to the apparatus aspects of the invention, the hook member which engages around the sink faucet generally includes a hook member which is preferably an integrally formed lateral extension of the upper rim and extends outwardly therefrom. The hook member is provided with a length and thickness such that it can be used to hook around the faucet of most sinks and when let go acts to suspend the colander from the sink faucet such that the upper rim is in a nearly horizontal orientation.

In an alternative embodiment, the hook member is provided with an upper rim extension at the end of which there is pivotally joined thereto an adjustable hooking arm. A user with a sink having a nonstandard distance from the back of the faucet to the back wall of the sink can thus still practice the invention with this variation.

In the embodiment where the colander has sink rim engaging means, which is useful with a double basin sink or for use in a sink which does not have a centralized faucet, the engaging means includes an L-shaped hook member the short arm of which projects laterally and outwardly from the upper rim a distance of from about one inch to about five inches, and preferably from one and a half inches to about three inches. The long arm of the L-shaped hook member then extends downward a distance forming an angle with the underside of the short arm of from sixty degrees to one hundred ten degrees, and preferably in the range of from sixty five degrees to ninety degrees. The length of the long arm of the L-shaped hook member is largely related to the capacity of the colander, and can range from as little as two inches to as much as six inches for household usage and substantially larger for a colander designed for commercial use.

Another modification of the embodiment having the sink rim engaging means includes providing the bowl portion of the colander with at least one portion of the upper rim and a portion of the bowl wall adjacent thereto with a substantially planar outer surface to provide a contact area with the wall of the sink. The height of the flattened portion of rim and wall is similar to the length of the long arm of the L-shaped hook member, although the length may vary substantially depending mostly on the capacity and dimensions of the bowl portion.

BRIEF DESCRIPTION OF THE DRAWINGS

For a more complete understanding of the present invention, reference may be had to the following detailed description of exemplary embodiments taken in conjunction with the accompanying figures of the drawings, in which.

DETAILED DESCRIPTION

With reference to FIGS. 1–5, a colander 10 is shown having an approximately ovate bowl portion 12 which is perforated by a plurality of holes 14 and slots 16 which are dimensioned in this case to allow retention of most styles of pasta, macaroni, fruit, vegetables, rice, etc. Persons of skill in the art can configure the arrangement of holes and slots to achieve a desired straining effect, while also achieving an attractive ornamental aspect to the combination and arrangement of such apertures. In addition, the invention is not limited to the substantially ovate bowl shape shown in the specific illustrative embodiment of the invention described herein. A large variety of bowl shapes and dimensions can be achieved in the practice of the invention, without affecting the functionality of the invention. In this specific illustrative embodiment of the invention, bowl portion 12 has dimensions along its width W' and length L' (see, FIGS. 4 and 5) so that a standard central faucet (not shown) having a radius of motion of approximately eight inches will, with a simple back and forth motion of the faucet, rinse all the contents of colander 10 when it is properly positioned thereunder, as will be discussed hereinbelow.

Bowl portion 12 is provided along its top edge thereof with a flange-like rim 18 which extends laterally outward therefrom. Again, the flange-like rim can be configured to achieve a desired ornamental aspect, without impeding any functionality of the invention. At a position at the rear of rim 18 and offset somewhat from an imaginary centerline of bowl portion 12, there is attached to rim 18 a nozzle engagement portion 20. Nozzle engagement portion 20 is provided with a laterally and outwardly extending stabilizer 22 which has, in this specific illustrative embodiment of the invention, a roughly triangular conformation. Persons of skill in the art can configure the outwardly extending stabilizer to any of numerous possible configurations which achieve the desired stabilization effect, and a desirable ornamental aspect.

A hook member 24 is attached at the end of stabilizer 22 distal from rim 18. Hook member 24 has a faucet contact surface 26 on the inside thereof and opposite rim 18. In this specific illustrative embodiment of the invention, contact surface 26 describes an arc of about sixty degrees or so. Persons of skill in the art can configure the hook member to different degrees of arc, sufficient to grip the back surface (not shown) of a centrally positioned sink faucet (not shown).

On the opposite side of bowl portion 12 from nozzle engagement portion 20, in rim 18 there is formed a grip portion 28 by which a user can hold colander 10 when manipulation is required. In this specific illustrative embodiment of the invention, grip portion 28 is shown to be provided with an aperture therethrough which may or may not be included in other embodiments, depending on the ornamental effect desired to be achieved by the designer of the product.

FIGS. 6–10 show additional embodiments of the present invention. In order to facilitate comprehension of the present disclosure, elements of structure which have corresponding elements in FIGS. 1–5, or which have already been described with respect to FIGS. 1–5, shall employ the same reference numeral, but increased by 100 or 200, as the case may be.

Figure 6:
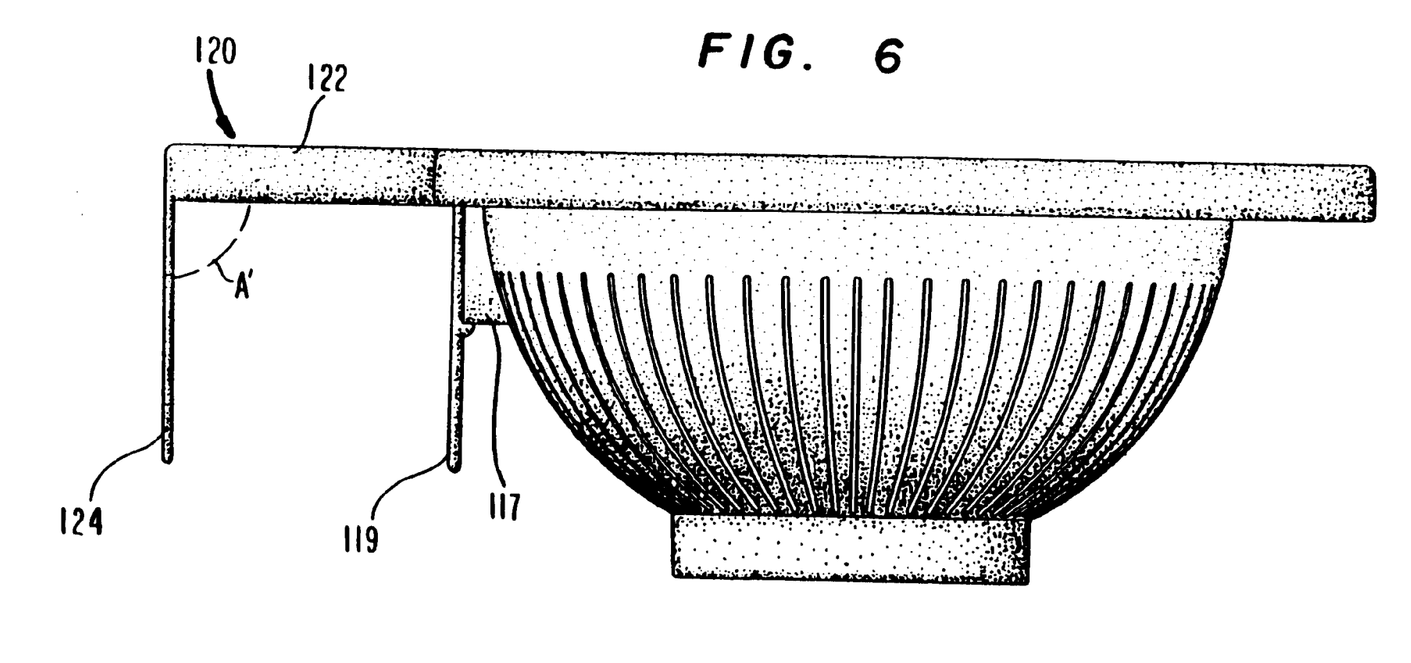
FIG. 6 shows a side elevation view of another exemplary embodiment of an apparatus for straining constructed in accordance with the principles of the present invention.
Figure 7:
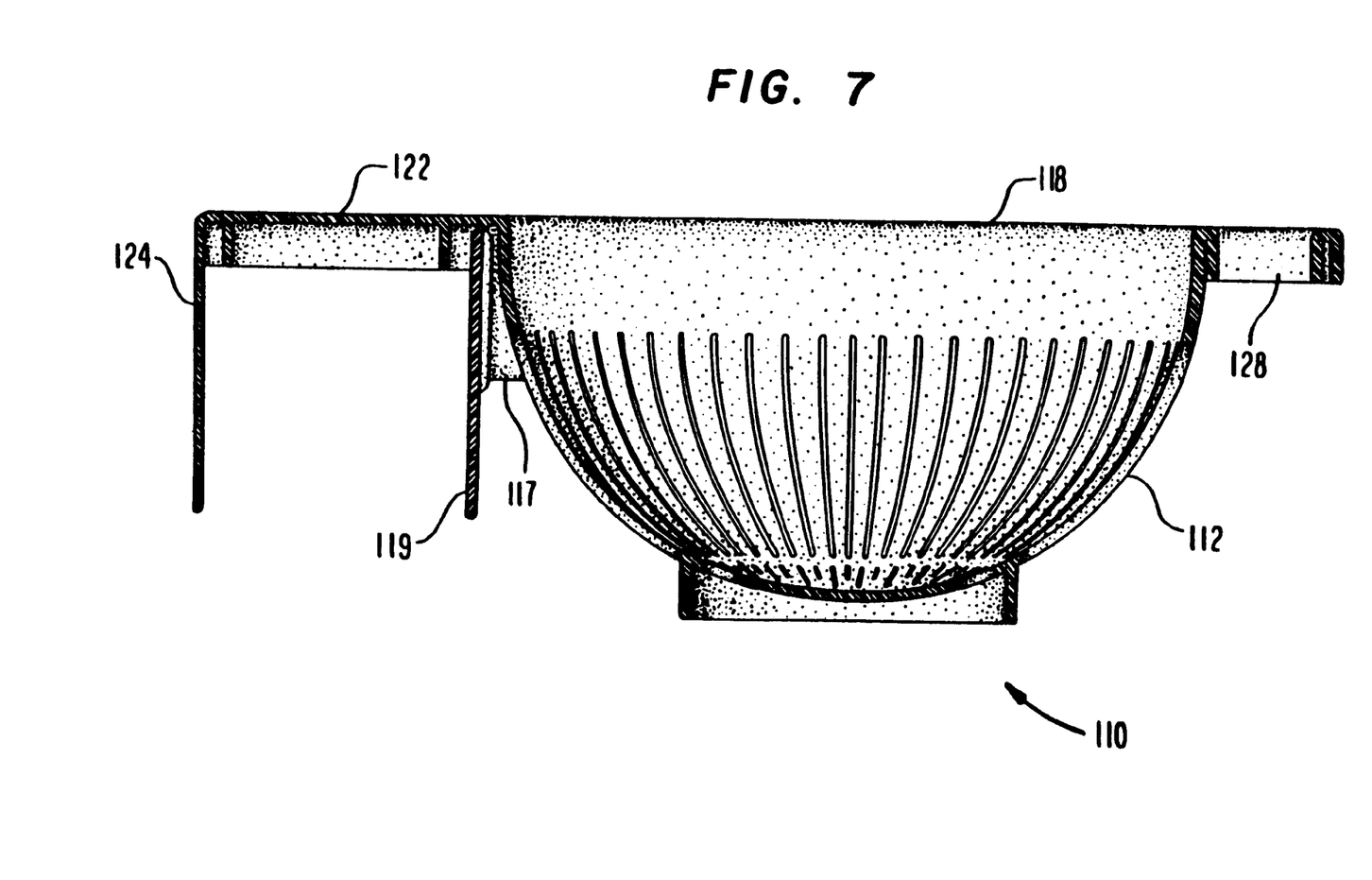
FIG. 7 shows a partial cross-section of the exemplary embodiment of an apparatus for straining as shown in FIG. 6.

With reference now to FIGS. 6 and 7, there is shown an alternate embodiment of a colander 110 having a bowl portion 112 which is perforated by a plurality of holes 114 and slots 116. As indicated hereinabove in regard of the embodiment of FIGS. 1–5, persons of skill in the art can configure the arrangement of holes and slots to achieve a desired straining effect, while also achieving an attractive ornamental aspect to the combination and arrangement of such apertures. In addition, the invention is not limited to the bowl shapes described herein. A large variety of bowl shapes and dimensions can be achieved in the practice of the invention, without affecting the functionality of the invention.

Referring once again to FIGS. 6 and 7, colander 110 is intended to be used by hanging same on the dividing wall (not shown) between the basins of a double sink (not shown) or from the outer wall of a sink (not shown) which does not have a central faucet around which nozzle engagement portion 20 of the previously described embodiment can be engaged. Therefore, sink rim engagement portion 120 is provided, in this specific illustrative embodiment of the invention, with a cross-sectionally L-shaped hook member 121. The L-shaped cross-sectional configuration is shown in FIG. 7 and is seen to have as a short arm the laterally and outwardly extending stabilizer 122 attached to rim 118 at a portion 123 of rim 118.

A wall 119 which is coupled to bowl portion 112 via a coupling portion 117 has a substantially planar configuration and is annexed to bowl portion 112. In this specific illustrative embodiment of the invention, stabilizer 122 is arranged to extend outward substantially parallel to an imaginary plane on the upper surface of rim 118, and orthogonal to wall 119. Stabilizer 122 has a length which is approximately one-quarter to two-thirds and preferably one-third to one-half of the overall length L' of bowl portion 112 (see, for example, FIG. 4). The stabilizer has a width of from one inch to five inches and preferably in the range of from one and one half inches to about three inches.

Figure 1:
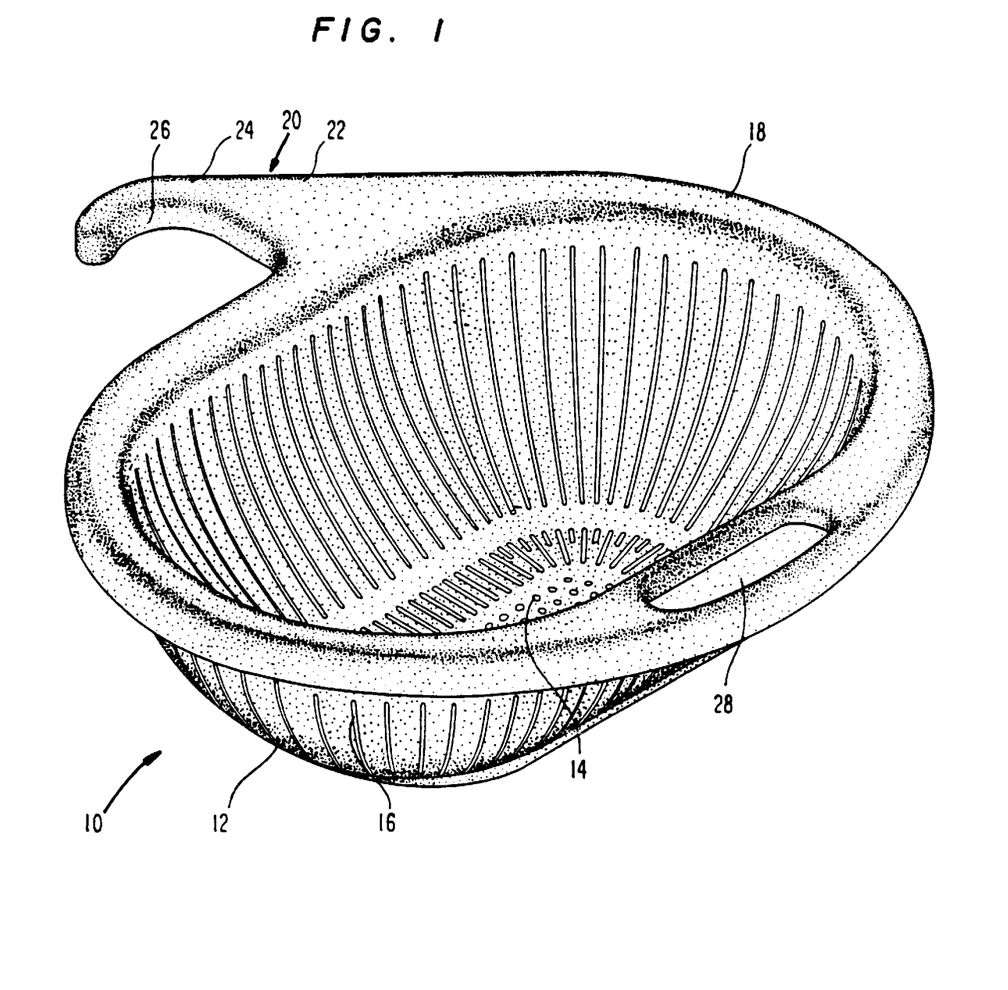
FIG. 1 shows a perspective view taken from the front left side of one exemplary embodiment of an apparatus for straining constructed in accordance with the principles of the present invention.
Figure 2:
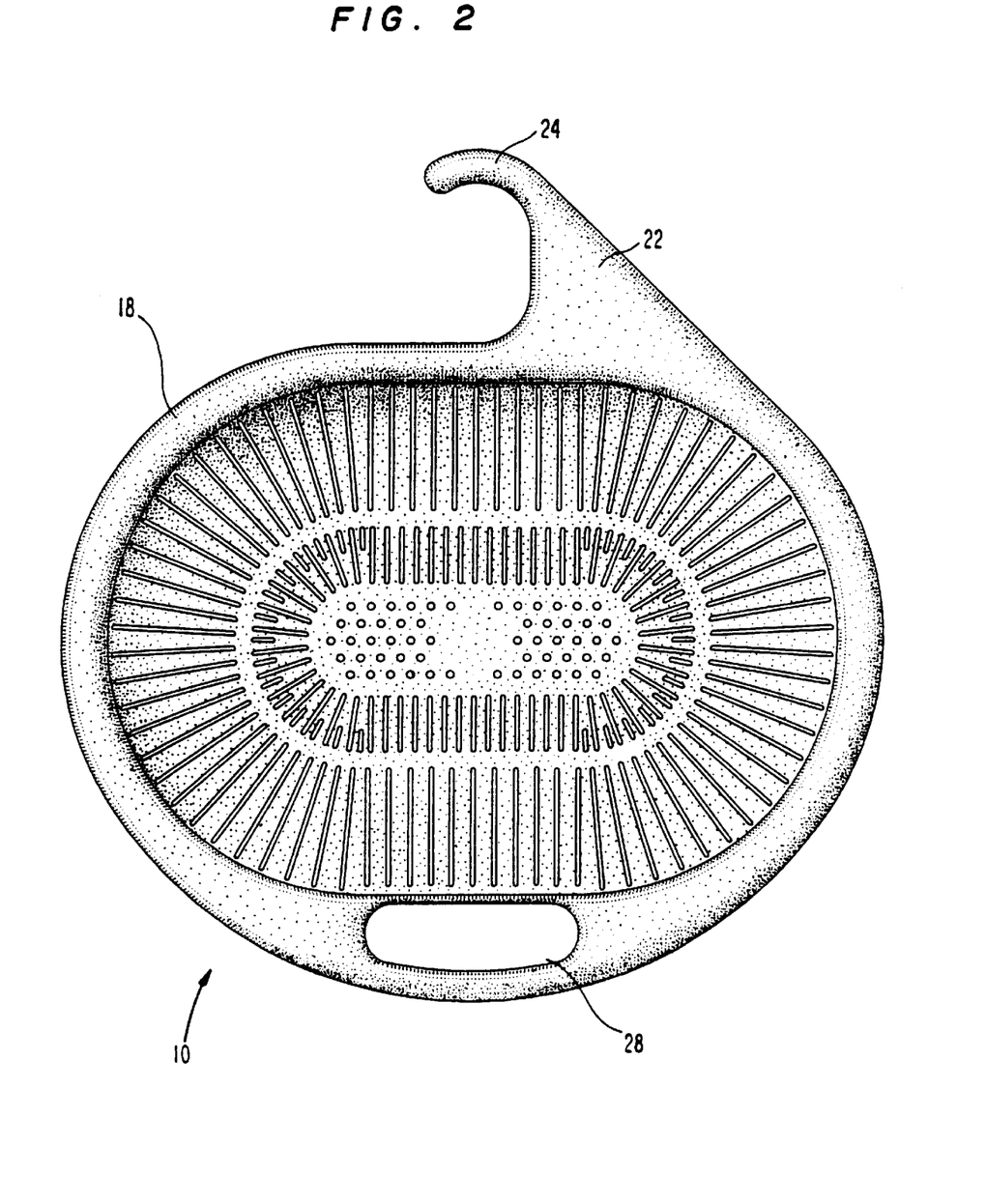
FIG. 2 shows a top plan view of the exemplary embodiment of an apparatus for straining as shown in FIG. 1.
Figure 3:
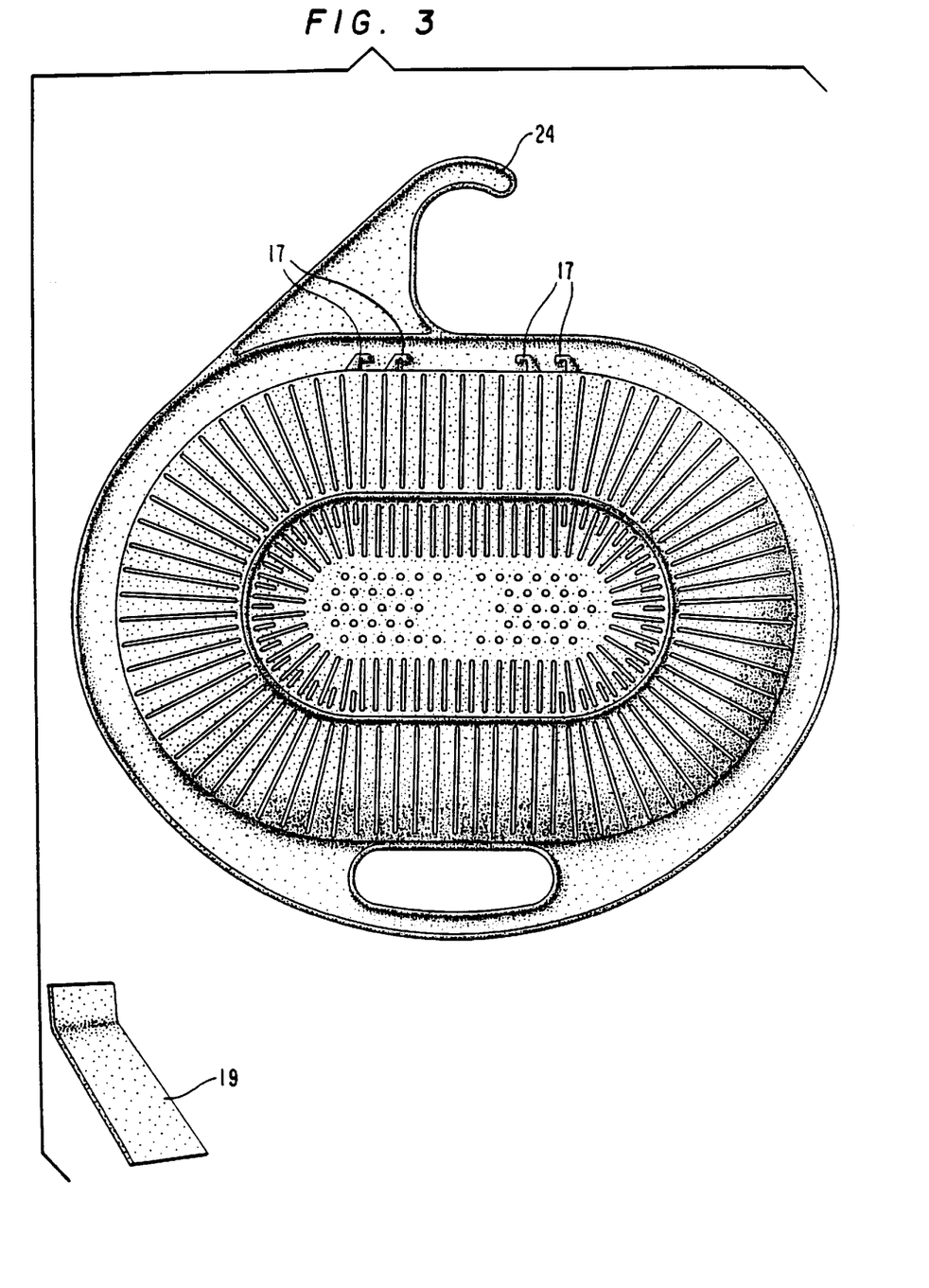
FIG. 3 shows a bottom plan view of the exemplary embodiment of an apparatus for straining as shown in FIG. 1.
Figure 4:
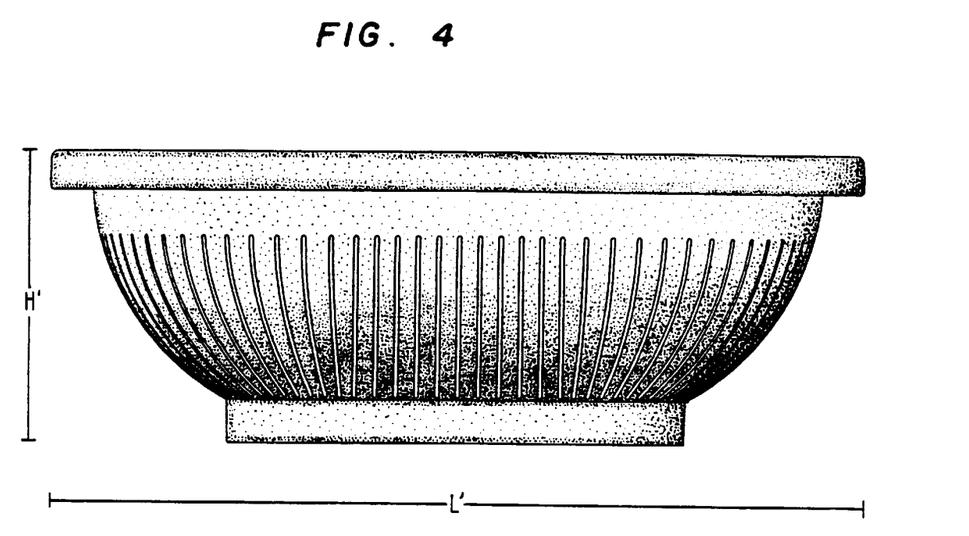
FIG. 4 shows a front elevation view of the exemplary embodiment of an apparatus for straining as shown in FIG. 1.
Figure 5:
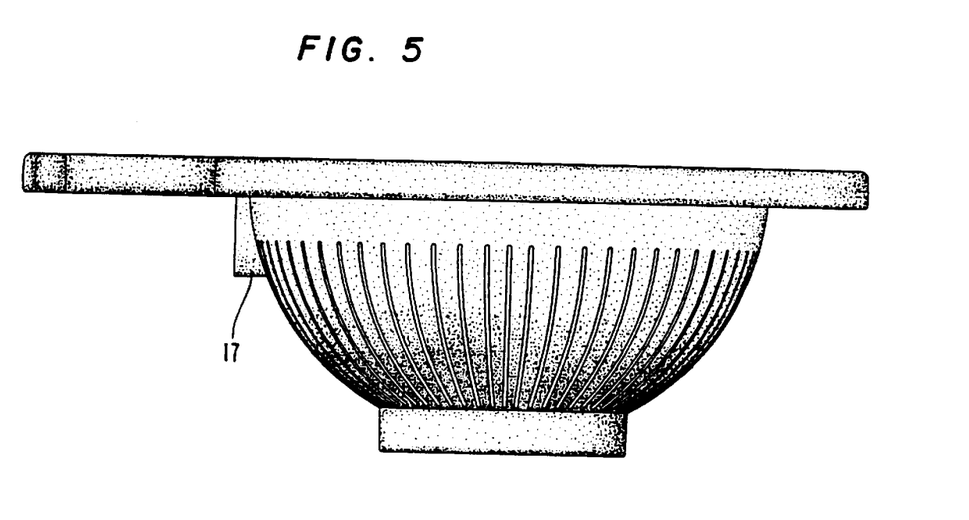
FIG. 5 shows a left side elevation view of the exemplary embodiment of an apparatus for straining as shown in FIG. 1.

At the edge of stabilizer 122, a distance of about one and a half inches to three inches from planar wall and rim portion 123, a long arm 124 of hook member 121 is provided to extend downwardly for a distance which is in the range of from about one-third to about two-thirds the overall height H' of colander 110 (see, for example, FIG. 4). Hook member 121 has an angle A' between long arm 124 and stabilizer 122 of from about sixty degrees to about one hundred and ten degrees, and preferably in the range of from about sixty five degrees to about ninety degrees.

When colander 110 is installed onto the rim of a sink (not shown), planar wall 119 and rim portions 123 provide a contact surfaces with the wall of the sink. Stabilizer 122 rests on the upper surface (not shown) of the sink's wall and surrounding counter top (not shown), or on a divider in the case of a double basin sink, making contact with the rim of the sink. Stabilizer 122 provides side stabilization preventing colander 110 from rocking side-to-side, while planar wall 119 in cooperation with long arm 124 provide stabilization preventing front-to-back movement of the colander.

Figure 8:
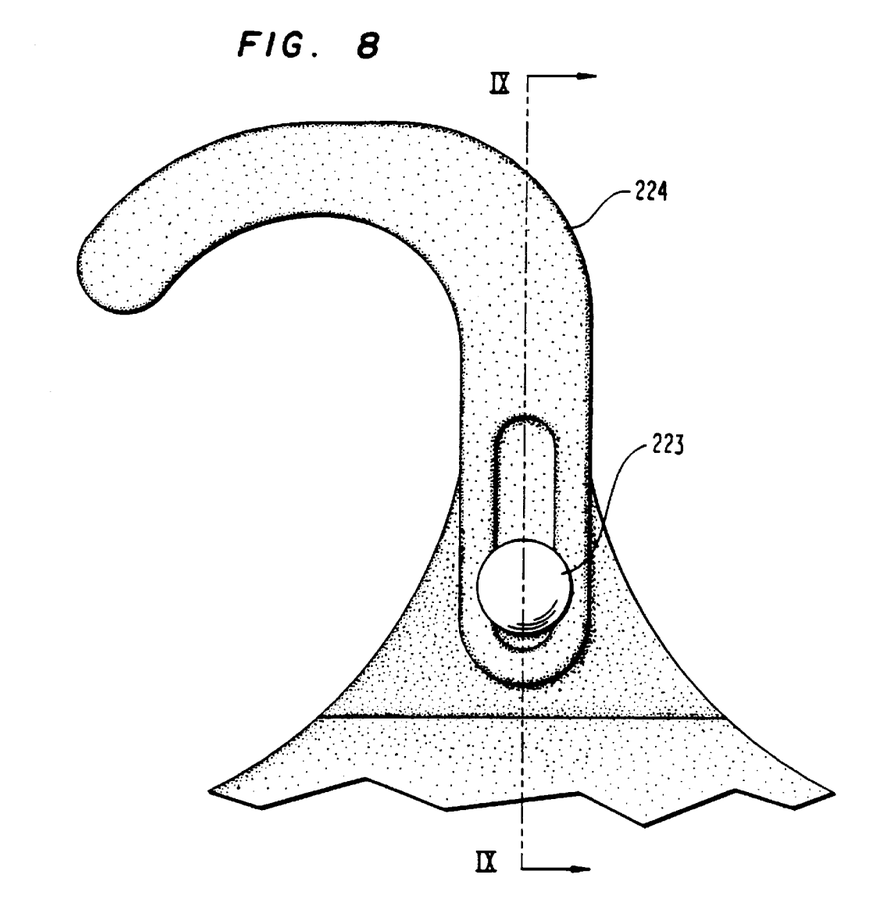
FIG. 8 shows a detailed view of one portion of an exemplary embodiment of an adjustable hook member for an apparatus for straining constructed in accordance with the principles of the present invention.
Figure 9:
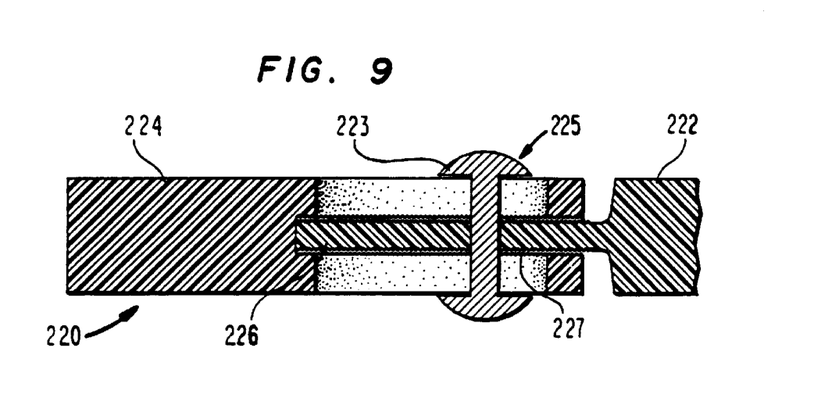
FIG. 9 shows a partial cross-section of the adjustable hook member shown in FIG. 8.

FIGS. 8 and 9 show a nozzle engagement portion 220 to have a stabilizer 222 extending from the rim (not shown in this figure) of the colander, as previously described. A hook member 224 is attached to the distal end of stabilizer 222 by a lockable sliding hinge 225. Thus, a user can adjust the distance between the contact surface of hook member 224 and the rim of the colander (not shown in this figure) to suit her particular sink's requirements.

The mechanism shown for hinge 225 includes complementary ridges 227 on an upper and/or lower surfaces of the distal end of stabilizer 222 as well as on the opposing lower and/or upper surfaces to inhibit movement under pressure of hook member 224 relative to stabilizer 222. Once adjusted to the correct length, a locking member 227 is engaged to prevent the need for later readjustment. It should, of course, be understood that this is only one of many methods by which the hook member can be made having a lockable, adjustable length, there being many other structures which would be easily identified by one skilled in the art of developing housewares and locking devices.

It is to be understood that the embodiments described herein are merely exemplary and that a person skilled in the art can make many variations and modifications without departing from the spirit and scope of the invention. For example, there are many materials from which the invention may be constructed including plastics, wood, metal, etc. Additionally, the shape of the bowl portion may be modified without significant effect on the use of the claimed invention, and to achieve a desired ornamental effect. All such modifications and variations are intended to be included within the scope of the invention as defined in the appended claims.

What is claimed is:

1. A colander for rinsing and straining at a sink having a bottom surface and a sink portion having a back surface facing away from the sink, the colander comprising:

a bowl portion having an upper rim and a wall portion defining an inner surface and an outer surface on opposite sides thereof, said bowl portion including a plurality of perforations in said wall portion extending between said inner and outer surfaces,     an engagement portion for coupling said bowl portion to the sink, said engagement portion having;

a stabilizer portion coupled at a first end thereof to said bowl portion and extending laterally away from said bowl portion along a stabilizer plane which is substantially parallel with said upper rim; and         a coupler portion coupled to a second end of said stabilizer portion and having a coupler contact surface for communicating with the back surface of the sink portion, whereby the colander is supported therefrom with said bowl portion elevated above the bottom surface of the sink, and     a length adjustment arrangement disposed intermediate of said coupler contact surface of said coupler portion and said outer surface of said bowl portion for enabling continuous adjustment of a distance therebetween.

2. The colander of claim 1, wherein said stabilizer portion is integrally formed with said coupler portion.

3. The colander of claim 2, wherein said coupler portion is arranged to extend at an angle of from approximately sixty degrees to approximately one hundred and ten degrees, and preferably in the range of from about sixty five degrees to about ninety degrees.

4. The colander of claim 3, wherein said coupler portion is arranged to extend at an angle of from approximately sixty five degrees to approximately ninety degrees.

5. The colander of claim 1, wherein said stabilizer portion is integrally formed with said wall portion of said bowl portion.

6. The colander of claim 1, wherein said stabilizer portion further comprises a stabilizer insert for preventing front-to-back movement of the colander, and said wall portion of said bowl portion is provided with a further coupling means for coupling said stabilizer insert to said bowl portion.

7. The colander of claim 1, wherein said stabilizer portion extends laterally away from said bowl portion along a plane substantially coplanar with a plane defined by said upper rim.

8. A method of employing a colander over a sink whereby the colander is elevated above the bottom of the sink, the colander being of the type having a bowl portion with a rim, the method comprising the steps of:

hooking a hook coupled to the colander around a faucet affixed to the sink whereby a supporting force having a predetermined direction is applied to a predetermined portion of the rim of the colander, whereby the colander is maintained by said supporting force elevated above the bottom of the sink; and stabilizing the colander with respect to a portion of the sink other than the bottom thereof whereby the colander is prevented from rotating in a direction substantially orthogonal to the supporting force.

9. The method of claim 8, wherein said step of hooking comprises the further steps of:

adjusting the length of the hook with respect to the colander, and fixing the length of the hook to a length dimension corresponding to the location of the faucet with respect to the sink.

* * * * *